May 15, 1951 J. S. JUDD 2,553,504
AUTOMOBILE BODY TRIM
Filed Oct. 11, 1948

Inventor
John S. Judd
by *[signatures]* Attys

Patented May 15, 1951

2,553,504

UNITED STATES PATENT OFFICE 2,553,504

AUTOMOBILE BODY TRIM

John S. Judd, Birmingham, Mich., assignor to Trim Trends, Inc., Detroit, Mich., a corporation of Michigan Application October 11, 1948, Serial No. 53,912

6 Claims. (Cl. 41—34)

This invention relates to an automobile body trim and more particularly to an ornamental device for ready attachment to a side surface of an automobile body for the purpose of improving the appearance of the body without detracting from the other appointments of the same.

Recently automobile manufacturers have materially changed the style of automobile bodies with particular regard to the rear end of the body. The effect of the change is to make the rear end more massive looking and yet at the same time it provides relatively greater luggage receiving space.

Now I have observed that while this change enhances the utilitarian aspects of the rear end of the vehicle, it detracts from the streamlined effect of the car as a whole.

Accordingly, it is the aim of this invention to provide a simple ornamental trim readily attachable on opposite sides of the rear end of the vehicle and which causes the appearance of the rear end of the vehicle to be more in keeping with the other streamlined contours of the same.

Another object of this invention is to provide an elongated trim readily attachable to a side surface of an automobile body in such a location that it will not only accentuate the streamlined effect of the body, but to a certain extent serves as a protective guard for the highly finished side surface of the body.

Yet another object of the invention is to provide a trim which in the act of fastening the same to the side of the vehicle can be stressed into a curved shape conforming to that of the surface of the body engaged thereby so that the trim can tightly hug the same.

A further object of the invention is to provide a channeled wheel trim for the side of an automobile body which can make use of the lamp supporting bracket for the attaching of the same and which at the same time will give the appearance of being a projection or extension of the lamp assembly.

In accordance with the general features of this invention there is provided an automobile body trim comprising a channeled element having divergent legs and being of progressively decreasing cross-section from one end to the other with the free edges of the legs positioned for flush contact with a side of an automobile body.

Yet another feature of the invention relates to the provision of a flange portion extending at substantially right angles from one end of the trim for abutment against and attachment to a lamp supporting surface on the automobile body between the surface and the lamp whereby the attaching means for the lamp can be used to hold that end of the trim in position.

Still another feature of the invention relates to providing attaching and tightening means at the other end of the element for progressively bowing the element in a longitudinal direction to bring the edges of its legs tightly against the surface of the automobile body engaged by the trim.

A still further feature of the invention relates to making the element of either a generally V-shaped or U-shaped cross-section in which the section progressively decreases from the lamp end of the element toward the front of the vehicle at which front end the section terminates in substantially a point. This feature gives the element the appearance of being an extension of the lamp assembly.

Other objects and features of this invention will more fully appear from the following detail description taken in connection with the accompanying drawing which illustrates a single embodiment thereof and in which.

As shown on the drawings.

Figure 1:
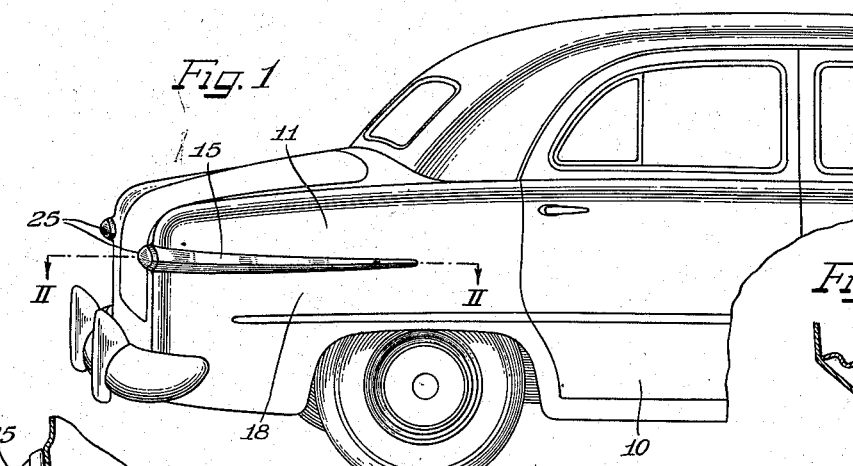
Figure 1 is a fragmentary side view of a rear end of an automobile showing my novel trim applied thereto.

The reference character 10 designates generally an automobile body having a rear bulged luggage compartment 11 of relatively great capacity. At this time it should be noted that while I have shown my trim at the rear end of the vehicle, it could be similarly applied to the fenders at the front end in cooperation with the customary lamps at the forward end of the vehicle.

It will be clear from Figure 1 that due to the massiveness of the luggage compartment 11 its appearance is not in keeping with the other streamlined appointments of the vehicle and hence requires ornamentation, such as is accomplished by the use of my trim, designated generally by the reference character 15. One of these trims 15 is applied on each of the sides of the body and since they are identical, a description of one will suffice for both.

Each trim element is made from any suitable material such, for example, as sheet steel, and may be bent into the desired shape on a suitable form under pressure or may be made in the form of a stamping.

Figure 2:
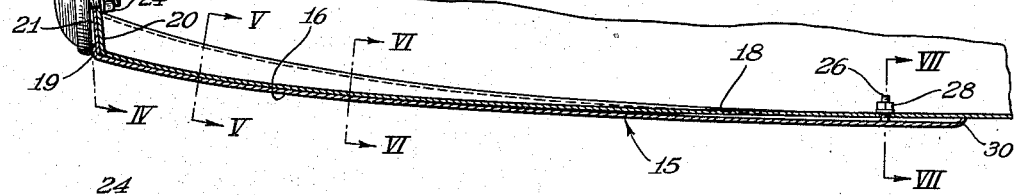
Figure 2 is an enlarged fragmentary cross-sectional view taken on substantially the line II—II of Figure 1 looking downwardly.
Figure 3:
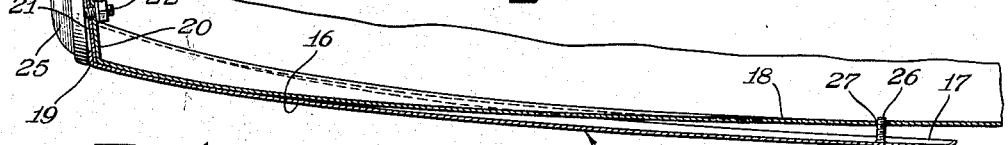
Figure 3 is a fragmentary cross-section view similar to Figure 2 but showing the condition of the element prior to the tightening of the fastening means at the end remote from the lamp assembly.
Figures 5, 6:
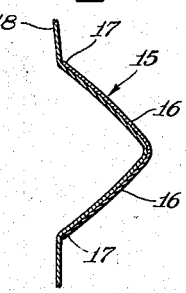
Figures 5 and 6 are enlarged fragmentary cross-sectional views taken on substantially the lines V—V and VI—VI, respectively, of Figure 2 and illustrating how the cross-section of the element progressively changes.
Figure 7:
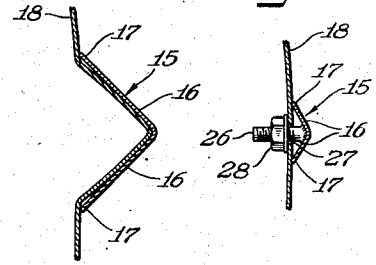
Figure 7 is a fragmentary cross-section view similar to Figures 5 and 6 but taken on the line VII—VII of Figure 2 at the attaching means for the end of the element and engageable with the outer side of the automobile body.

The element 15 comprises an elongated channel section of generally V-shaped cross-section which progressively decreases in section from the left hand end to the right hand end of Figures 1, 2 and 3. This progressive change in cross-sectional shape is shown in Figures 5, 6 and 7 taken at random at spaced points along the trim.

The divergent sides 16—16 of the trim 15 terminate in spaced edges 17—17 arranged to tightly contact the body or fender side surface 18 throughout the longitudinal length of the trim.

Figure 4:
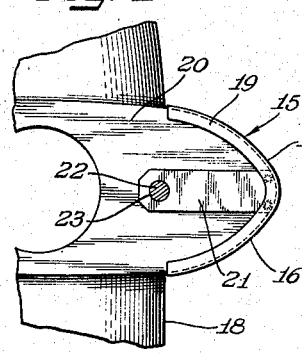
Figure 4 is a fragmentary detail view taken on substantially the line IV—IV of Figure 2 indicated by the arrows and showing how the lateral flanged construction of the lamp end of my element engages the lamp supporting surface.

At the outer or lamp end of the trim 15 its edges are folded laterally into a flange 19 generally at right angles to the trim (Figure 4). This flange 19 is adapted to abut a lamp supporting surface 20 on the rear of the body so as to hold the trim against movement in the direction of its length. In addition the trim is provided with a strap 21 which may be suitably fastened to the flange 19 (Figure 4) as by means of welding. This strap also extends laterally from the trim section over the supporting surface 20. It is provided with a hole 22 through which one of the bolts 23 of the lamp assembly 25 can extend. In other words, I propose to use the same bolt means as used for fastening the lamp 25 to the supporting surface 20.

In attaching the trim section to a side of the fender surface 18, the lamp 25 is first removed and the flange 19 of the trim is engaged over the surface 20. Thereafter the lamp assembly 25 is placed over the flange 19 and the strap 21 with the bolt 23 extending through the hole in the strap. A suitable nut 24 is threaded on the free end of the bolt from the inside of the luggage compartment to tighten the lamp 25 tightly against flange 19 and strap 21. This results in one end of the trim being firmly attached to the lamp end of the fender surface 18.

When thus fastened the trim 15 will appear as shown in Figure 3. From this illustration it will be perceived that the other end of the trim 15 is provided with a stud 26 adapted to extend through a hole 27 in the fender wall or surface 18. In this condition of the trim it may be slightly spaced from the fender surface 18. However, by tightening the nut 28 on the stud 26, as shown in Figure 2, the entire section may be bowed or curved longitudinally to bring its edges 17—17 tightly against the surface 18.

The forward end of the trim 15 adjacent the stud 26 may be formed into a closed point, as indicated at 30, to improve its appearance. The point also tightly engages the fender surface 18 when the trim is fastened in position. After the trim has been applied to the vehicle body, in the manner above described, it will appear to constitute, as shown in Figure 1, a streamlined pointed extension on the lamp assembly 25, thereby greatly enhancing the ornamental appearance of the corresponding end of the vehicle.

Figure 8:
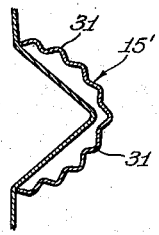
Figure 8 is a fragmentary sectional view similar to Figure 5 of a modification of the invention.

In Figure 8 I have shown a slight modification of the invention wherein the trim 15' is exactly the same as the trim 15 with the exception that it is more nearly of a U-shaped cross-section and is longitudinally corrugated at 31 to rigidify and further enhance its appearance.

With the exception of the drilling of the bolt holes 27 in the vehicle or fender wall, the attachment of my trim to the vehicle requires no further change in the vehicle body. Also it is clear that the nuts 28 can be readily applied to the studs 26 of the two opposite trims 15 from the interior of the luggage compartment of the vehicle.

I claim as my invention:

1. As an article of manufacture, automobile body trim comprising a longitudinally channeled element having divergent legs and being of progressively decreasing cross-section from one end to the other with the free edges of the legs positioned for flush contact with a side of an automobile body, said element having a flange portion bent laterally from one end thereof for abutment against and attachment to an end part of the automobile body and having attaching and tightening means at its other end for progressively bowing the element in a longitudinal direction to bring the edges of its legs tightly against the surface of the automobile body.

2. As an article of manufacture, automobile body trim comprising a longitudinally channeled element of generally V-shaped cross-section and progressively decreasing in symmetric form from one end to another with the edges of the element positioned for flush contact with a side of an automobile body, said element having means for attaching it to an automobile body and for resiliently bending the element from one end to another to bow same tightly against the automobile body.

3. In an ornamental trim for an end of an automobile body of the type having a curved outer surface terminating at one end in a lamp supporting surface extending laterally therefrom, said trim comprising a longitudinally channeled element having divergent legs with the free edges of the legs positioned for flush contact with said outer surface, and said element also having extending laterally from an end thereof a flange for abutment and securement against said lamp supporting surface, and additional attaching means at the other end of said element for progressively bowing the element in longitudinal direction so as to curve its edges tightly against said body outer surface.

4. In an ornamental trim for an end of an automobile body of the type having a curved outer surface terminating at one end in a lamp supporting surface extending laterally therefrom, said trim comprising a longitudinally channeled element having divergent legs with the free edges of the legs positioned for flush contact with said outer surface, and means for attaching said element to said lamp supporting surface and for bowing said element longitudinally tightly against said body outer surface.

5. In an ornamental trim for an end of an automobile body of the type having a curved outer surface terminating at one end in a lamp supporting surface extending laterally therefrom, said trim comprising a longitudinally channeled element having divergent legs and being of progressively decreasing cross-section from one end to the other with the free edges of the legs positioned for flush contact with said outer surface, and said element also having extending laterally from an end thereof a flange for abutment and securement against said lamp supporting surface, said end of the element also having between said lateral flange a lateral strap for engagement by the means used to fasten the lamp on said supporting surface.

6. In an ornamental trim for an end of an automobile body of the type having a curved outer surface terminating at one end in a lamp supporting surface extending laterally therefrom, said trim comprising a longitudinally channeled element having divergent legs and being of progressively decreasing cross-section from one end to the other with the free edges of the legs positioned for flush contact with said outer surface, and said element also having extending laterally from an end thereof a flange for abutment and securement against said lamp supporting surface, said channeled element being generally of a V cross-section progressively reducing in size from said flange end of the element to the other end of the same and terminating in substantially a point at said other end.

JOHN S. JUDD.

REFERENCES CITED

The following references are of record in the file of this patent:

UNITED STATES PATENTS

| Number | Name | Date |
| --- | --- | --- |
| D. 103,248 | Pribil | Feb. 16, 1937 |
| 1,928,883 | De Long | Oct. 3, 1933 |
| 1,954,348 | Deservi | Apr. 10, 1934 |
| 2,144,863 | Webber | Jan. 24, 1939 |
| 2,186,683 | Raymond | Jan. 9, 1940 |
| 2,213,506 | Thoresen | Sept. 3, 1940 |
| 2,220,826 | Place | Nov. 5, 1940 |
| 2,383,575 | Wernig | Aug. 28, 1945 |

OTHER REFERENCES

Collier's Magazine, April 19, 1947, page 65.